United States Patent Office 3,615,104
Patented Oct. 26, 1971

3,615,104
COLLAPSIBLE BICYCLE
Kei Fujiyoshi, Toyonaka-shi, Kotaro Hata, Nara-shi, Toshikazu Fujii, Yao-shi, Tsunemitsu Yaso, Sakai-shi, Katsuji Kagayama, Osaka, Hiroshi Fujimoto, Yao-shi, Sigehiro Houjiyou, Sakai-shi, Tosimi Otuka, Tondabayashi-shi, and Sigeru Morita, Sakai-shi, Japan, assignors to Matsushita Electric Industrial Co., Inc., Osaka, Japan
Filed Dec. 10, 1969, Ser. No. 883,805
Claims priority, application Japan, Dec. 11, 1968, 43/92,499, 43/92,501, 43/92,502
Int. Cl. B62k 15/00
U.S. Cl. 280—287       4 Claims

ABSTRACT OF THE DISCLOSURE

A bicycle of the present invention comprises a body including a front body section and a rear body section, said front body section comprising a pipe member having a connecting means for a handle and a front fork at its front end and a connecting means for a seat at its rear end, said pipe member being arcuately curved at its intermediate portion, said rear body section being provided at its rear ends with a bearing portion for a rear wheel and at its front end with a chevron shaped portion, said chevron shaped portion being provided at its forward side with a forwardly opening recess and at its bottom side with a portion for receiving a crankshaft, said front and rear body sections being removably connected together, so that they can readily be assembled or disassembled prior to or after use of the bicycle.

---

The present invention relates to a bicycle and more particularly to a collapsible bicycle, and has a prime object to provide a bicycle which can conveniently be assembled and disassembled by a user prior to and after usage of the bicycle and which can readily be transported by disassembling it and can conveniently be reassembled.

Another object of the present invention is to make it easy and convenient to assemble and disassemble a bicycle by providing a rear body section which does not necessarily have seat stays or the like and by constructing the bicycle so that it can be disassembled without disconnecting an endless belt or chain stretched between a pulley on the rear wheel and a pulley mounted on the crank shaft.

Hithertofore, various types of collapsible bicycles have been proposed, however, most of the known types have been inconvenient in assembling and disassembling and did not have sufficient strength at their connections.

For example, in such a type that has a substantially triangular frame provided with seat stays and chain stays mounted on the frame, since a crank is mounted on the front body, it has been required to remove the chain in order to disassemble the rear body having the seat stays and the chain stays, so that inconveniencies have often been encountered in assembling and disassembling for daily use and housing the bicycle. Further, in another type in which a frame comprises a plurality of separated pipe members, the connections of the pipe members do not have sufficient strength and a complicated structure is required to provide a sufficiently strong connection.

The present invention is aimed to eliminate the above described disadvantages and provide a bicycle which can readily be disassembled for housing it after daily usage into a front body section having a handle and a front wheel mounted thereon and a rear body section having a rear wheel and a crank mounted thereon, and which can readily be assembled for use and has connections of sufficient strength.

The present invention will now be described with reference to a preferred embodiment shown in the accompanying drawings in which;

FIG. 3 is a fragmentary sectional view showing the arrangement of a pulley, a crankshaft and a rear body section.

Figure 1:
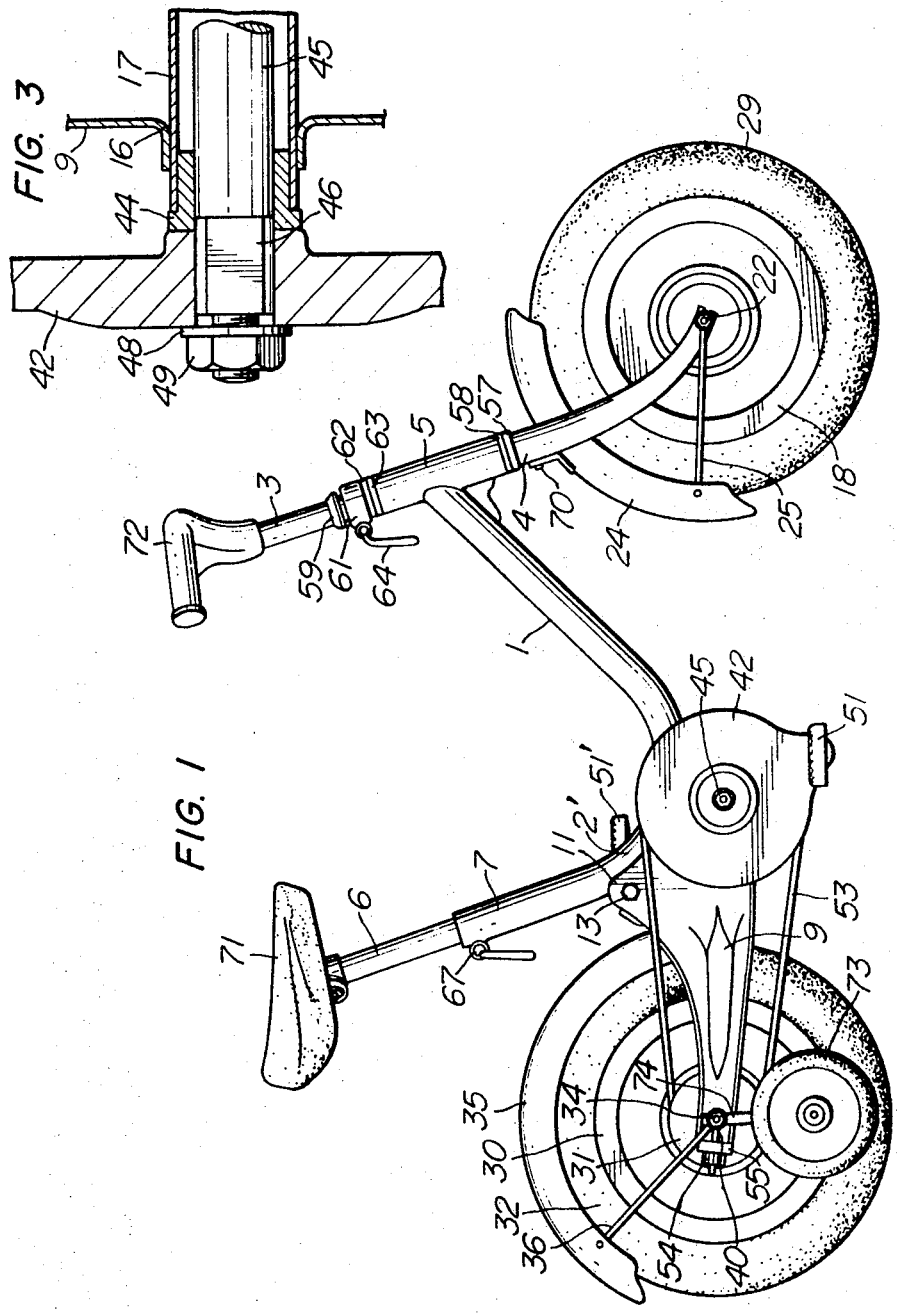
FIG. 1 is a side elevational view of a bicycle showing a preferred embodiment of the present invention.
Figure 2:
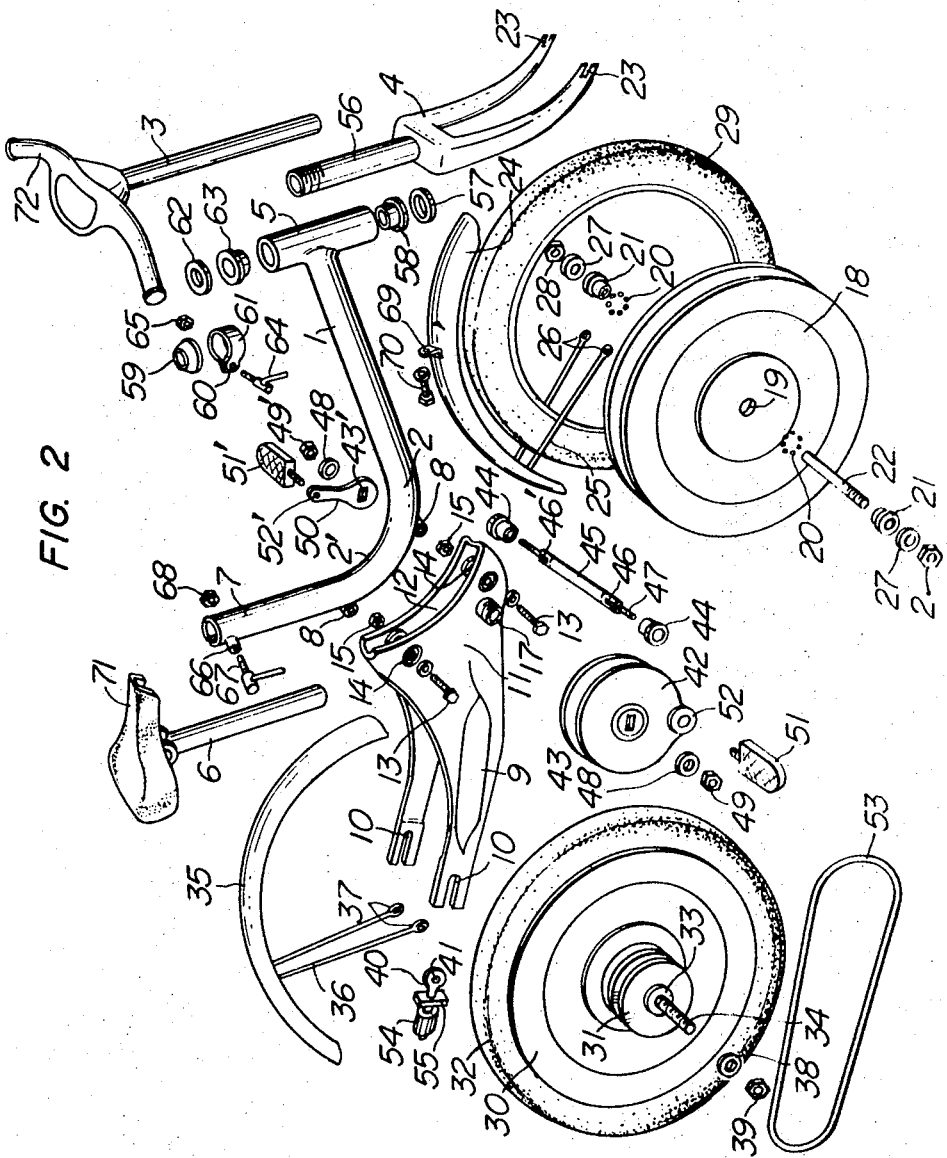
FIG. 2 is an exploded perspective view of the bicycle shown in FIG. 1.

Referring now to the drawings, the reference numeral 1 shows a front body section which comprises a pipe member having a substantially arcuately curved portion 2 provided at its intermediate rearward portion, a cylindrical member 5 welded to its forward end for connecting a handle post 3 and a front fork 4, and a connecting portion 7 provided at its rear end for receiving a saddle post 6. A pair of small pipe sections 8 and 8 are welded to the curved portion 2 one at the substantially center portion and the other at the end of the curvature of the portion 2. The reference numeral 9 shows a rear body section which is formed by welding a pair of opposed sheet metal press members. The rear body section 9 is provided with a pair of cutouts 10 and 10 at its rear end for receiving a rear wheel axis and a chevron shaped portion at its forward portion. The chevron shaped portion is provided at its forward side with an arcuately shaped connecting portion 11 which is recessed to form a U-shape at its upper and lower end and which is so arranged as to co-operate with the rear half 2' of the curved portion 2 of the front body section 1. The portion 11 is provided with a groove 12 for receiving the outer periphery of the rear half 2' of the front body section 1, and has a pair of opposed side walls having aligned holes 14 and 14 for receiving a pair of bolts 13 and 13 which are adapted to be inserted into the small pipe sections 8 and 8 of the front body section. Portions of the side walls are slightly inwardly projected at the areas around the bolt holes 14 and 14 so that, when the bolts 13 and 13 are inserted into the holes 14 and 14 and the pipe sections 8 and 8, and tightened by nuts 15 and 15, said projected portions abut to the end surfaces of the pipe sections 8 and 8. Further, the connecting portion 11 is provided at its lower side with an outward projection to form a through-hole 16 to which a crank hanger pipe 17 is inserted and integrally welded.

The numeral 18 shows a front wheel made of pressed sheet metal members or reinforced plastics. The wheel 18 is formed with a center axial hole 19 in which a pair of ball bearings 20 and 20 are retained by means of a pair of bearing pipes 21 and 21 inserted from the opposite ends of the hole 19. A wheel axle 22 is inserted into the bearing pipes 21 and 21. The front fork 4 and stays 25 for a front fender 24 are connected to the axle 22 inserted into the bearing pipes 21 and 21 by engaging slits 23 of the front fork and eye holes of the front fender stays 25 with the opposite ends of the axle 22 and tightening by means of a pair of nuts 28 with the intervention of washers 27. The reference numeral 29 shows a tire having an air tube therein and adapted to be secured around the outer periphery of the front wheel 18.

The reference numeral 30 shows a rear wheel which is identical in construction to the front wheel 18 except that the former is provided with a pulley 31 having therein a ratchet mechanism for allowing a free reverse rotation. Further, the numeral 32 shows a tire having a pneumatic tube therein, 33 a bearing pipe, and 34 a wheel axle. The rear body section 9 and stays 36 for a rear fender 35 are connected to the opposite ends of the axle 34 by engaging the slits 10 of the section 9 and the eye holes 37 of the stays 36 with the axle 34 and tightening nuts 39 with the intervention of washers 38. A position adjusting piece 40 for the axle is mounted on the axle 34 by its hole 41.

The reference numeral 42 shows a pulley which also serves as a crank and has a slit 43 at its center. A crankshaft 45 is inserted into a pair of bearing pipes 44 and 44 which are mounted on the hanger pipe 17 in the rear body section 9. The shaft 45 has an end portion 46 which is of rectangular cross-section for engagement with the slit 43 of the pulley 42. The pulley 42 and the shaft 45 are secured together by means of a nut 49 threadably engaging with a thread portion 47 of the shaft 45 with the intervention of a washer 48. The other end 46' of the shaft 45 is received by a slit 43' of a crank 50 and secured by a washer 48' and a nut 49'. The reference numeral 51 shows a foot pedal secured to a threaded hole 52 provided in the outer peripheral portion of the pulley 42, and 52 a foot pedal secured to a threaded hole 52' provided in the crank 50. The reference numeral 53 shows a V-belt stretched around the pulley 31 on the rear wheel and the pulley 42. The tension of the V-belt can be adjusted by means of adjusting member 55 which is abutting to the end surface of the slit 10 in the rear body section 9 by moving the adjusting piece 40 in the fore-and-aft direction within the slit 10 through the adjustment of a screw 54.

The handle post 3 and the front fork 4 are connected to the front body section 1 by inserting a ring 57 and a bearing pipe 58 into a tubular portion 56 provided on the upper end of the front fork 4 and thereafter inserting the tubular portion 56 into the cylindrical member 5 of the front body section 1, then inserting the handle post 3 into a ring 59, a split clamp 61, a ring 62 and a bearing pipe 63, and thereafter into the tubular portion 56. The clamp 61 has a clamping bolt hole 60 and is tightened on a threaded portion at the upper end of said front fork by means of a bolt 64 and a nut 65. The connecting portion 7 at the rear end of the front body section 1 is provided with a longitudinal slit and tightening holes 66 disposed at the opposite sides of the slit, whereby the seat post 6 inserted into the connecting portion 7 is secured to the body section by tightening a bolt 67 and a nut 68.

The front fender 24 is formed at its upper end with a lug 69 for connecting it to the rear portion of the front fork 4 by means of a bolt 70. Further, the rear fender is secured at its forward portion by any suitable means to the rear portion of the chevron shaped portion of the rear body section 9. The reference numeral 71 shows a seat which is removable mounted on the seat post 6, 72 a handle, and 73 an auxiliary wheels connected to the rear wheel 34 by means of L-shaped legs 74.

According to the present invention, a bicycle comprises a rear body portion 9 having a bearing portion 10 for a wheel at its rear end and a chevron shaped portion at its front portion, said chevron shaped portion having at its front side an arcuately curved connecting portion 11, the rear body section 9 being connected with a front body section 1 having an arcuately curved portion 2, so that the connection between the front and the rear body sections can be of substantial length and the strength of the connection can be substantially increased as compared with an arrangement in which a length of pipe is divided into two parts and connected together at the divided portion. Further, since the connecting portion 11 is provided at one side of the chevron shaped portion, the connecting portion 11 can be reinforced by the other side of the chevron shaped portion so that the connecting portion has no tendency of being broken. Additionally, according to the present invention, a torsional resistance of the front body section 1 can also be increased by providing a groove 12 in the connecting portion 11 so that it has side walls extending along the curved portion 2' of the front body section 1. The provision of the groove 12 has an additional advantage in that the groove 12 can accommodate any manufacturing errors in the curvature of the curved portion and is effective to eliminate any plays in the connection which may have adverse effects on the strength of the connection.

Further, the bicycle in accordance with the present invention can be readily assembled and disassembled due to the fact that the rear body section 9 is provided with a chevron shaped portion at its forward portion for connecting with the front body section 1 so that the bicycle does not have to be provided with seat stays or the like which are conventionally employed in known types of bicycles. In a conventional bicycle having seat stays and chain stays, since a chain is stretched across the chain stays and engages with a sprocket on the rear wheel at the inboard side of the seat stays, if the seat stays and the chain stays are integrally connected, the chain must necessarily be disconnected to remove it. In contrast to this, according to the present invention, since the rear body section 9 is provided with a chevron shaped portion for connecting with the front body section 1, seat stays or the like should not necessarily be provided behind the connecting portion, so that the rear body section can be connected to or disconnected from the front body section without disconnecting the chains. In the present invention, a V-belt can also be used in the place of the chain. By using a V-belt, lubricant oil as needed in the chain can be dispensed with, so that the bicycle can even be assembled or disassembled in a room without polluting the room.

Further, since the crank for driving the rear wheel is supported on the rear body section 9, the only work that is to be done for daily use and housing is to connect or disconnect the connection between the front body section 1 having a front wheel and a handle and the rear body section 9 having a rear wheel, a crank, a belt and the like. The bicycle in accordance with the present invention may be marketed in a form of a set in which the seat 71, the seat post 6, the front wheel, the handle post 3, the front fork 4 and the front fender 24, etc., are removed from the front body section 1, and the rear wheel, the pulley 42 and the belt 53, etc., from the rear body section 9, so that the user can enjoy the assembling of a bicycle.

As described above, the bicycle in accordance with the present invention comprises a front body section including a pipe member having a connecting portion for a handle and a front fork at its front end, said pipe member being provided at its substantially center portion with a curved portion, and a rear body portion having a bearing portion for a rear wheel at its rear ends and a chevron shaped portion at its front portion, said chevron shaped portion being provided at its front side with an arcuate recess which opens so as to co-operate with the curved portion of the front body section and at its lower side with means for receiving a crankshaft, so that the connection between the front and the rear body sections has a substantial strength against torsional force and the body sections can readily and conveniently be assembled and disassembled during daily use and housing with the rear wheel and the crank permanently mounted on the rear body reaction.

What is claimed is:

1. A bicycle comprising a front body section including a pipe member having a connecting portion for a handle and a front fork at its front end and a connecting portion for a seat at its rear end, said pipe member being provided at its substantially center portion with an arcuately curved portion, a rear body portion having a bearing portion for a rear wheel at its rear ends and a chevron shaped portion at its forward portion, said chevron shaped portion being provided at its front side with a forwardly opening recess and at its lower side with means for receiving a crankshaft, means for removably connecting said front and rear body sections together.

2. A bicycle in accordance with claim 1 in which said rear body section comprises a pair of opposed sheet members which are welded together.

3. A bicycle in accordance with claim 1 in which the recess of the chevron shaped portion formed at the forward portion of the rear body section has opposed side walls extending arcuately along the outer peripheral portion of the arcuately curved portion of said front body section.

4. A bicycle comprising a front body section including a pipe having a connecting portion for a handle and a front fork at its front end and a connecting portion for a seat at the rear end, said pipe member being provided at its substantially center portion with an arcuately curved portion, a rear body section having a bearing portion for a rear wheel at its rear ends and a chevron shaped portion at its forward portion, said chevron shaped portion being provided at its front side with a forwardly opening recess and at its lower side with means for receiving a crankshaft, a rear wheel supported by the bearing portion of said rear body section and having a pulley, a pulley secured to a crankshaft which is journalled in said means for receiving the crankshaft, and endless means stretched between the pulley on said rear wheel and the pulley secured on the crankshaft.

References Cited

UNITED STATES PATENTS

| 1,293,643 | 2/1919 | Harley | 280—281 |
| 2,468,933 | 5/1949 | Jones | 280—261 X |
| 2,495,859 | 1/1950 | Mennesson | 280—281 |
| 3,359,012 | 12/1967 | Westerheide | 280—287 |

FOREIGN PATENTS

| 625,611 | 12/1962 | Belgium | 280—287 |
| 1,415,802 | 9/1965 | France | 280—287 |

KENNETH H. BETTS, Primary Examiner

U.S. Cl. X.R.

280—279

UNITED STATES PATENT OFFICE
CERTIFICATE OF CORRECTION

Patent No. 3,615,104                    Dated October 26, 1971

Inventor(s) Kei FUJIYOSHI et al

It is certified that error appears in the above-identified patent and that said Letters Patent are hereby corrected as shown below:

The Assignee should read --MATSUSHITA ELECTRIC
                            INDUSTRIAL CO., LTD.-- and not "Matsushita Electric Industrial Co., Inc."

Signed and sealed this 18th day of April 1972.

(SEAL)
Attest:

EDWARD M. FLETCHER, JR.            ROBERT GOTTSCHALK
Attesting Officer                  Commissioner of Patents